(12) United States Patent
Bruce et al.

(10) Patent No.: US 9,686,161 B2
(45) Date of Patent: Jun. 20, 2017

(54) CONSENSUS LOSS IN DISTRIBUTED CONTROL SYSTEMS

(71) Applicant: Axis AB, Lund (SE)

(72) Inventors: Mathias Bruce, Lund (SE); Olle Blomgren, Staffanstorp (SE)

(73) Assignee: AXIS AB, Lund (SE)

( * ) Notice: Subject to any disclaimer, the term of this patent is extended or adjusted under 35 U.S.C. 154(b) by 286 days.

(21) Appl. No.: 14/028,243

(22) Filed: Sep. 16, 2013

(65) Prior Publication Data

US 2015/0081805 A1  Mar. 19, 2015

(51) Int. Cl.

| | |
|---|---|
| *G06F 15/16* | (2006.01) |
| *H04L 12/26* | (2006.01) |
| *G06F 9/50* | (2006.01) |
| *G06F 11/14* | (2006.01) |
| *G07C 9/00* | (2006.01) |
| *G06F 21/55* | (2013.01) |
| *G06F 17/30* | (2006.01) |
| *G06F 11/20* | (2006.01) |

(52) U.S. Cl.
CPC .......... *H04L 43/065* (2013.01); *G06F 9/5061* (2013.01); *G06F 11/142* (2013.01); *G06F 21/554* (2013.01); *G07C 9/00* (2013.01); *H04L 43/0811* (2013.01); *H04L 43/0823* (2013.01); *G06F 11/20* (2013.01); *G06F 15/16* (2013.01); *G06F 17/30* (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 6,243,744 B1 * | 6/2001 | Snaman, Jr. | .......... | G06F 9/5061 709/220 |
| 7,325,046 B1 * | 1/2008 | Novaes | .................. | G06F 9/5061 709/201 |
| 7,620,680 B1 * | 11/2009 | Lamport | ............... | H04L 63/123 709/201 |
| 7,739,677 B1 * | 6/2010 | Kekre | ................. | G06F 11/1425 709/214 |

(Continued)

FOREIGN PATENT DOCUMENTS

EP        1107119        6/2001

OTHER PUBLICATIONS

Extended European Search Report issued in corresponding European Application No. 13185572.8, 8 pages.

*Primary Examiner* — Viet Vu
*Assistant Examiner* — James Edwards
(74) *Attorney, Agent, or Firm* — Snyder, Clark, Lesch & Chung, LLP

(57) ABSTRACT

A device may correspond to a physical access controller in a distributed physical access control system. A method, performed by the device in a distributed system, may include detecting that another device in the distributed system has become unavailable; determining that a loss of consensus has occurred in the distributed system based on detecting that the other device has become unavailable; generating a list of available devices in the distributed system; and sending an alarm message to an administrative device, wherein the alarm message indicates the loss of consensus and wherein the alarm message includes the list of available devices.

23 Claims, 13 Drawing Sheets

(56) References Cited

U.S. PATENT DOCUMENTS

| | | | | |
|---|---|---|---|---|
| 8,621,062 | B1* | 12/2013 | Anderson | G06F 11/30 709/223 |
| 2003/0078946 | A1* | 4/2003 | Costello | G06F 11/2064 |
| 2003/0187927 | A1* | 10/2003 | Winchell | G06F 11/1492 709/204 |
| 2004/0139125 | A1* | 7/2004 | Strassburg | G06F 11/2064 |
| 2005/0283373 | A1* | 12/2005 | Lamport | G06F 11/2041 714/11 |
| 2007/0208688 | A1* | 9/2007 | Bandhole | G06Q 30/02 |
| 2007/0216764 | A1* | 9/2007 | Kwak | H04L 12/64 348/14.06 |
| 2008/0077635 | A1* | 3/2008 | Sporny | G06F 17/30206 |
| 2008/0209506 | A1* | 8/2008 | Ghai | G06F 21/55 726/1 |
| 2009/0080443 | A1 | 3/2009 | Dziadosz | |
| 2010/0017644 | A1* | 1/2010 | Butterworth | G06F 11/1658 714/4.1 |
| 2011/0131193 | A1* | 6/2011 | Pasupuleti | G06F 17/30359 707/704 |
| 2011/0179231 | A1* | 7/2011 | Roush | G06F 3/0622 711/152 |
| 2011/0302449 | A1* | 12/2011 | Douceur | G06F 11/187 714/15 |
| 2012/0197822 | A1* | 8/2012 | Lee | G06F 9/5061 706/10 |
| 2013/0080559 | A1* | 3/2013 | Rao | H04L 67/1097 709/208 |
| 2013/0311659 | A1* | 11/2013 | Curran | H04L 67/1097 709/225 |
| 2014/0095925 | A1* | 4/2014 | Wilson | G06F 11/1425 714/4.12 |

* cited by examiner

| DISTRIBUTED DATA SET | SYSTEM UNITS | | | | | | QUORUM |
|---|---|---|---|---|---|---|---|
| | A | B | C | D | E | F | |
| MASTER DATABASE | X | X | X | X | X | X | 4 |
| BUILDING COUNTER | | X | | | | X | 2 |
| ROOM C COUNTER | X | | X | X | | | 2 |

CONSENSUS LOSS IN DISTRIBUTED CONTROL SYSTEMS

FIELD

This disclosure generally relates to access control systems, and more specifically, to consensus loss in distributed access control systems.

BACKGROUND INFORMATION

A distributed system may include components that communicate and coordinate their actions to achieve a set of tasks. For example, computers in a distributed system may communicate over a network in order to coordinate to solve an algorithm. In order to successfully coordinate simultaneous operations on independent computers, such as data and resource management or synchronization of processing steps, a distributed algorithm may need to be implemented. Various distributed algorithms have been developed to coordinate components of a distributed system.

SUMMARY

According to one aspect, a method, performed by a device in a distributed system, may include detecting, by the device, that another device in the distributed system has become unavailable; determining, by the device, that a loss of consensus has occurred in the distributed system based on detecting that the other device has become unavailable; generating, by the device, a list of available devices in the distributed system; and sending, by the device, an alarm message to an administrative device, wherein the alarm message indicates the loss of consensus and wherein the alarm message includes the list of available devices.

Additionally, the method may include receiving, from the administrative device, an instruction to create a consensus-based distributed system that includes at least some of the available devices included in the list; and creating the consensus-based distributed system in response to receiving the instruction.

Additionally, creating the consensus-based distributed system may include selecting a number of devices required to generate a quorum, wherein the number corresponds to a smallest number of devices from the available devices needed to achieve a majority.

Additionally, the method may include assigning a voting weight to a device of the at least some of the available devices, wherein the voting weight gives more weight to a vote received from the device than to a vote received from another device of the at least some of the available devices when the device is voting for a quorum in the created the consensus-based distributed system.

Additionally, the voting weight may be based on at least one of a location of the device; a membership of the device in a particular subset of the plurality of physical access control devices; a device type associated with the device; a threat level assigned to the device; or a measure of reliability associated with the device.

Additionally, the voting weight may be based on at least one of one or more logged events associated with the device; a frequency of activation of a peripheral device associated with the device; or a frequency of administrative login associated with the device.

Additionally, detecting that another device in the distributed system has become unavailable may include at least one of detecting that a connection to the other device has been lost; receiving an indication of device failure from the other device; or detecting that the other device is associated with a security breach.

Additionally, sending the alarm message to the administrative device may include at least one of sending a Web Services message to the administrative device; sending an email message to the administrative device; sending a Short Message Service message to the administrative device; or sending a real-time quality of service message to the administrative device.

Additionally, the method may include maintaining the list of available devices in the distributed system; and updating the list of available devices at particular intervals.

Additionally, the distributed system may include a distributed dataset, and the method may further include generating an emergency distributed dataset, in response to determining that a loss of consensus has occurred in the distributed system, wherein the emergency distributed dataset is based on the distributed dataset; and creating an emergency consensus-based distributed system that includes the available devices included in the list, in response to determining that a loss of consensus has occurred in the distributed system, wherein the emergency consensus-based distributed system uses the emergency distributed dataset.

Additionally, the method may further include receiving, from the administrative device, an instruction to create a consensus-based distributed system that includes the available devices included in the list; and incorporating data from the emergency distributed dataset into the distributed dataset, in response to receiving the instruction to create the consensus-based distributed system.

Additionally, the device may correspond to an embedded system.

Additionally, the distributed system may include a distributed physical access control system, and wherein the device and the other device correspond to physical access control units.

According to another aspect, a device of a distributed system may include logic configured to detect that another device in the distributed system has become unavailable; determine that a loss of consensus has occurred in the distributed system based on detecting that the other device has become unavailable; generate a list of available devices in the distributed system; and send an alarm message to an administrative device, wherein the alarm message indicates the loss of consensus and wherein the alarm message includes the list of available devices.

Additionally, the logic may be further configured to receive, from the administrative device, an instruction to create a consensus-based distributed system that includes at least some of the available devices included in the list; and create the consensus-based distributed system in response to receiving the instruction.

Additionally, when the logic is creating the consensus-based distributed system, the logic may be further configured to select a number of devices required to generate a quorum, wherein the number corresponds to a smallest number of devices from the available devices needed to achieve a majority.

Additionally, when the logic is creating the consensus-based distributed system, the logic may be further configured to assign a voting weight to a device of the at least some of the available devices, wherein the voting weight gives more weight to a vote received from the device than to a vote received from another device of the at least some of the available devices when the device is voting for a quorum in the created the consensus-based distributed system.

Additionally, the voting weight may be based on at least one of a location of the device; a membership of the device in a particular subset of the plurality of physical access control devices; a device type associated with the device; a threat level assigned to the device; a measure of reliability associated with the device; one or more logged events associated with the device; a frequency of activation of a peripheral device associated with the device; or a frequency of administrative login associated with the device.

Additionally, when the logic is detecting that another device in the distributed system has become unavailable, the logic may be configured to detect that a connection to the other device has been lost; receive an indication of device failure from the other device; or detect that the other device is associated with a security breach.

Additionally, when sending the alarm message to the administrative device, the logic may be further configured to send a Web Services message to the administrative device; send an email message to the administrative device; send a Short Message Service message to the administrative device; or send a real-time quality of service message to the administrative device.

Additionally, the distributed system may include a distributed dataset, and the logic may be further configured to generate an emergency distributed dataset, in response to determining that a loss of consensus has occurred in the distributed system, wherein the emergency distributed dataset is based on the distributed dataset; create an emergency consensus-based distributed system that includes the available devices included in the list, in response to determining that a loss of consensus has occurred in the distributed system, wherein the emergency consensus-based distributed system uses the emergency distributed dataset; receive, from the administrative device, an instruction to create a consensus-based distributed system that includes the available devices included in the list; and incorporate data from the emergency distributed dataset into the distributed dataset, in response to receiving the instruction to create the consensus-based distributed system.

Additionally, the distributed system may include a distributed physical access control system, and wherein the device and the other device correspond to physical access control units.

According to yet another aspect, a distributed system may include a plurality of physical access control devices, wherein a particular one of the plurality of physical access control devices is configured to detect that another device in the distributed system has become unavailable; determine that a loss of consensus has occurred in the distributed system based on detecting that the other device has become unavailable; generate a list of available devices in the distributed system; send an alarm message to an administrative device, wherein the alarm message indicates the loss of consensus and wherein the alarm message includes the list of available devices; receive, from the administrative device, an instruction to create a consensus-based distributed system that includes at least some of the available devices included in the list; and create the consensus-based distributed system in response to receiving the instruction.

DETAILED DESCRIPTION OF PREFERRED EMBODIMENTS

Figure 1:
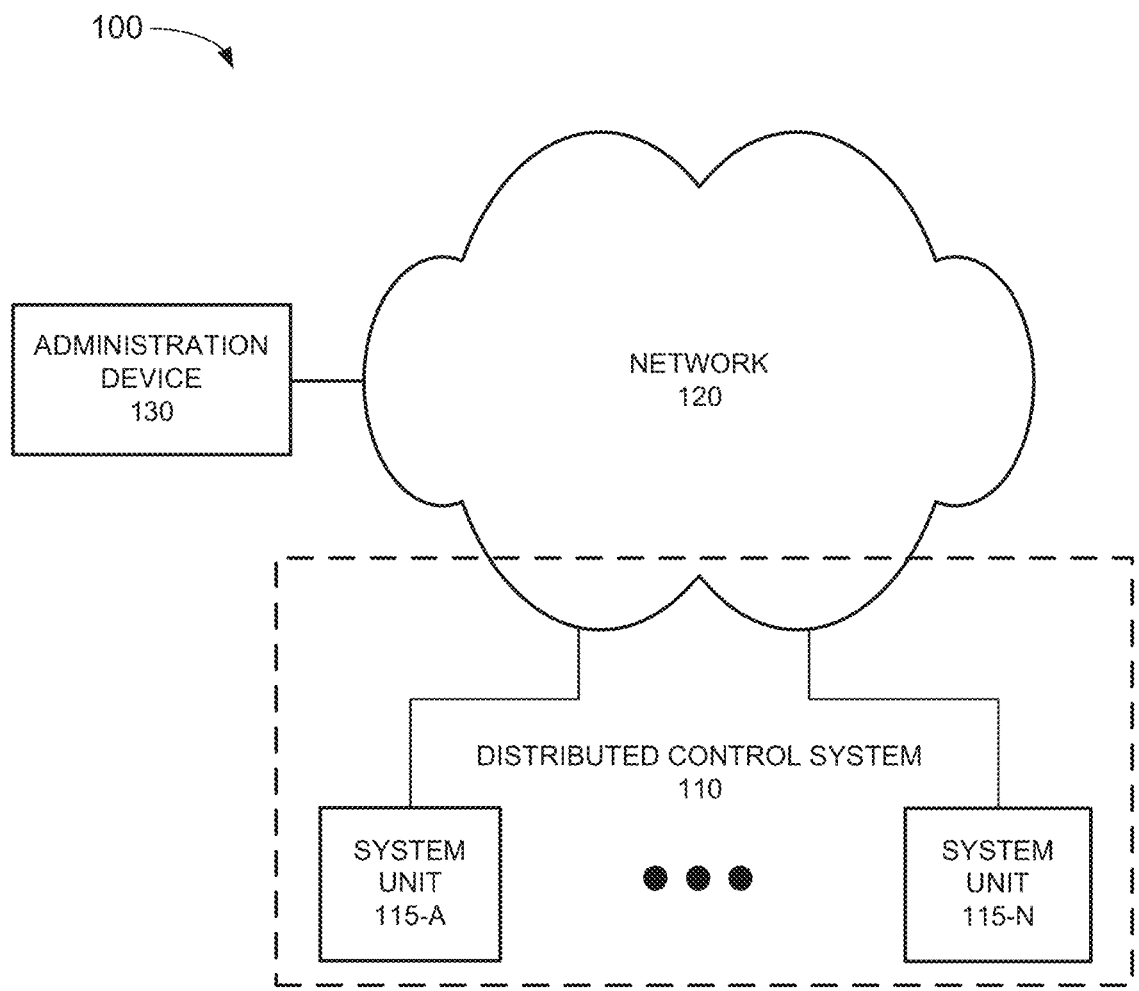
FIG. 1 is a block diagram illustrating an exemplary environment according to an embodiment described herein.

The following detailed description refers to the accompanying drawings. The same reference numbers in different drawings identify the same or similar elements.

Implementations described herein relate to consensus loss in distributed control systems. In one embodiment, a distributed control system may include a distributed physical access control system. A physical access control system may include one or more control or system units, each controlling physical access to an area of a facility. For example, control or system unit may obtain credentials from a user and may unlock a door lock if the user's credentials are verified. In other implementations, a distributed control system may include a distributed building management system, a distributed monitoring system, a distributed security system, and/or another type of a distributed control system.

A distributed control system may perform distributed computing operations using a distributed algorithm. For example, a distributed control system may manage a distributed data base. A distributed algorithm may include a consensus algorithm. A consensus algorithm may require that a consensus be reached by the nodes in a distributed system before an operation is performed. For example, to update a distributed database employing a consensus algorithm, the nodes in the distributed system reach a consensus to perform the update. When consensus is reached, the nodes (e.g., all the nodes) may then agree to a proposed operation (e.g., a change to a distributed database). A consensus may be reached if a quorum is obtained for a proposed operation. A quorum may be reached if a majority of the nodes votes for the proposed operation. In this embodiment, requiring a majority of nodes to vote for a change may ensure that, if two conflicting proposed changes are being considered, at least one node receives both of the proposed changes and selects to vote for one of the proposed changes.

A consensus loss in a distributed system may occur if a quorum cannot be reached. For example, if a particular number of nodes fails or is unreachable, a quorum for a proposed operation may not be obtained and the distributed system may not be able to continue to operate. A consensus loss may be automatically handled by changing the number of nodes in the system or by bringing reserve nodes into the system. However, in distributed control systems, such solutions may not be desirable. For example, changing the number of nodes in the system or bringing in reserve nodes may change the functionality of the system. As another example, reserve nodes may not be available. As yet another example, if communication between two subsets of nodes in a distributed control system is interrupted and a new consensus-based system is automatically created using the available nodes in each subset, a split-brain problem may occur. In a split-brain problem, the two subsets each form their own distributed system, resulting in two versions of a distributed dataset being maintained.

Implementations described herein may include a device in a distributed system configured to detect that another device in the distributed system has become unavailable and to determine that a loss of consensus has occurred in the distributed system based on detecting that the other device has become unavailable. The device may be configured to generate a list of available devices in the distributed system and to send an alarm message to an administrative device. The alarm message may indicate that a loss of consensus has occurred and may include the list of available devices. An administrator may determine whether to create a new distributed system based on the generated list of available devices. Generation of a new distributed system using the available devices may be desirable in some situations and not desirable in other situations. The device may be configured to receive, from the administrative device, an instruction to create a consensus-based distributed system that includes at least some of the available devices included in the list and to create the consensus-based distributed system in response to receiving the instruction. Generating a list of available devices and requiring approval from an administrator to form a new consensus-based system using the available devices may prevent a split-brain problem in a consensus-based distributed system.

FIG. 1 is a block diagram of an exemplary environment 100 in which the systems and/or methods described below may be implemented. As shown in FIG. 1, environment 100 may include a control system 110 (e.g., a distributed physical access control system), a network 120, and an administration device 130.

Distributed control system (DCS) 110 may include a distributed computing system that includes system units 115-A to 115-N (referred to collectively as "system units 115" and individually as "system unit 115"). System unit 115 may be implemented as an embedded system. In some implementations, system unit 115 may include a physical access control device. For example, system unit 115 may include an access controller that controls access to a secured area, such as a room or a group of rooms. System unit 115 may receive credentials (e.g., access card credentials) via a reader device and to determine whether the credentials are authentic and are associated with authority to access the secure area. If so, the access controller may issue a command to open a lock on a door or perform other operations associated with granting access to the secure area. In other implementations, system unit 115 may include a different type of security device, such as a monitoring device, a device that controls the operation of a machine, etc.

DCS 110 may include one or more distributed datasets. A distributed dataset includes a dataset associated with multiple devices, wherein the In one embodiment, multiple devices may communicate and coordinate with each other to make changes to the dataset. In one embodiment, a local copy of the distributed dataset is maintained by each device that is associated with the distributed dataset and if a change is agreed upon by the devices, the change is replicated to the local copies of the distributed datasets. In another embodiment, not all the devices store a local copy of the distributed dataset, for example.

In some embodiments, consensus is reached in order for a change to be made in the distributed dataset (e.g., a consensus-based distributed database). In other embodiments, a change may be made to the distributed dataset without consensus. A distributed dataset may be associated with all system units 115 or may be associated with a subset of system units 115. A system unit 115 may propose a change to a consensus-based distributed dataset. If the change is accepted by a quorum of system units 115 associated with the distributed dataset, a consensus may be reached and the change may be propagated to each local copy of the distributed dataset in each associated system unit 115. Thus, a consensus with respect to a change in the distributed dataset may be reached if a quorum of the associated system units 115 votes for the change. A quorum may correspond to the smallest majority of the associated system units 115. Thus, if a distributed dataset is associated with N system units 115, a quorum may be reached if N/2+1 associated system units 115 votes for the change if N is an even number, or if (N−1)/2+1 associated system units 115 votes for the change if N is an odd number. Requiring a smallest majority to reach a quorum may ensure that when considering two conflicting proposals, at least one system unit 115 receives both proposals and selects one of the proposals for consensus.

A consensus-based distributed dataset may ensure that any system unit 115 associated with the distributed dataset includes the information (e.g., all the information in one embodiment) managed by the distributed dataset. For example, a distributed dataset may include access rules and the access rules may be available to any system unit 115 associated with the distributed dataset. Thus, as a result of the one or more distributed datasets, in one embodiment, DCS 110 may correspond to a decentralized system with no central controlling device, such as a server device. In other embodiments, DCS 110 may include both a decentralized system and a central controlling device (such as a server device). Changes to DCS 110 may be configured at any system unit 115 and if the change is associated with a distributed dataset, the change may be propagated to other system units 115 associated with the distributed dataset. Furthermore, DCS 110 may exhibit robustness with respect to device failure, as a single point of failure may be avoided. For example, if a particular system unit 115 fails, the other system units 115 may continue to operate without loss of data (or with the minimization of loss of data). Moreover, DCS 110 may be changed dynamically. For example, applications may be added at any time and new datasets may be stored in system units 115 as needed.

DCS 110 may also include datasets that are not distributed. As an example, a first system unit 115 may include a local dataset that is not included in any other system unit 115. As another example, a first system unit 115 may include a local dataset that is replicated to a second system unit 115 in a non-distributed manner, such as by being mirrored. As yet another example, a first system unit 115 may include a first version of a local dataset and a second system unit 115 may include a second version of the local dataset, wherein the first system unit 115 maintains the first version of the local dataset and the second system unit 115 maintains the second version of the local dataset. In yet another example, a first system unit 115 may derive a first local dataset from a distributed dataset and a second system unit 115 may derive a second local dataset from the distributed dataset, wherein the first local dataset is different from the second local dataset.

Network 120 may enable system units 115 to communicate with each other and/or may enable administration device 130 to communicate with particular system units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 may enable an administrator to connect to a particular system unit 115 in order to configure DCS 110, change a configuration of DCS 110, receive information from DCS 110, and/or otherwise administer DCS 110. Administration device 130 may include any device configured for communicating with a system unit 115. For example, administration device 130 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100. For example, in some implementations, system units 115 may include an input and/or output device (e.g., keyboard/keypad and display, touchscreen, etc.) and administration device 130 may not be needed.

Figure 2:
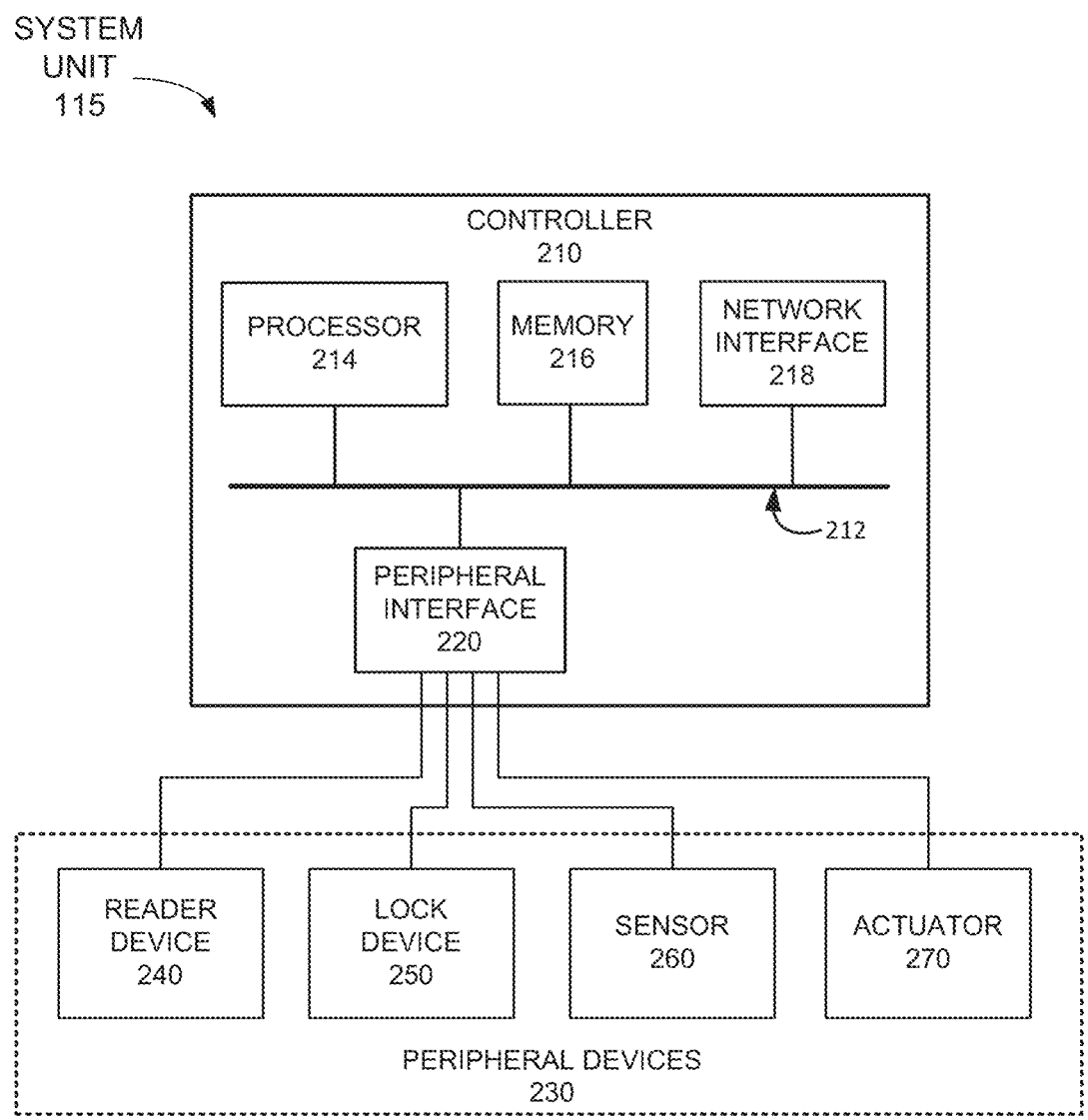
FIG. 2 is a block diagram illustrating exemplary components of a system unit of FIG. 1.

FIG. 2 is a block diagram illustrating exemplary components of a system unit 115. As shown in FIG. 2, system unit 115 may include a controller 210 and one or more peripheral devices 230. Controller 210 may control the operation of system unit 115, may communicate with other system units 115, may communicate with administration device 130, and/or may control peripheral devices 230. Controller 210 may include a bus 212, a processor 214, a memory 216, a network interface 218, a peripheral interface 220, and a housing 222.

Bus 212 may include a path that permits communication among the components of controller 210. Processor 214 may include any type of single-core processor, multi-core processor, microprocessor, latch-based processor, and/or processing logic (or families of processors, microprocessors, and/or processing logics) that interprets and executes instructions. In other embodiments, processor 214 may include an application-specific integrated circuit (ASIC), a field-programmable gate array (FPGA), and/or another type of integrated circuit or processing logic.

Memory 216 may include any type of dynamic storage device that may store information and/or instructions, for execution by processor 214, and/or any type of non-volatile storage device that may store information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency (RF), infrared, and/or visual optics, etc.), or a combination of wireless and wired communication links. Network interface 218 may include a transmitter that converts baseband signals to RF signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi) card for wireless communications. Network interface 218 may also include a universal serial bus (USB) port for communications over a cable, a Bluetooth™ wireless interface, a radiofrequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices using a Serial Peripheral Interface Bus protocol, such as a Wiegand protocol, an RS-485 protocol, and/or another type of protocol. As another example, peripheral interface 220 may use a different type of protocol. In one embodiment, network interface 218 may also act as a peripheral interface for coupling peripherals 230 to controller 210.

Housing 222 may enclose the components of controller 210 and may protect the components of controller 210 from the environment. In one embodiment, housing 222 may include one or more of peripheral devices 230. In another embodiment, housing 222 may include administration device 130. Housing 222 may define the boundaries of one system unit 115 and/or controller 210 from other system units 115 and/or controllers 210 in a multi system unit 115/controller 115 system.

As described below, controller 210 may perform certain operations relating to managing consensus loss in a distributed system. Controller 210 may perform these operations as a result of hardwired circuitry of an ASIC. Controller 210 may also (or alternatively) perform these operations in response to processor 214 executing software instructions contained in a computer-readable medium, such as memory 216. A computer-readable medium may include a non-transitory memory device. A memory device may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Peripheral devices 230 may include one or more devices that provide information to controller 210, that are controlled by controller 210, and/or that otherwise communicate with controller 210. For example, peripheral devices 230 may include a reader device 240, a lock device 250, a sensor 260, and/or an actuator 270. While a single reader device 240, a single lock device 250, a single sensor 260, and a single actuator 270 are shown in FIG. 2 for illustrative purposes, in practice, peripheral devices 230 may include multiple reader devices 240, multiple lock devices 250, multiple sensors 260, and/or multiple actuators 270. In some implementations, peripheral devices 230 may not include one or more of the devices shown in FIG. 2. Additionally or alternatively, peripheral devices 230 may include any other type of security device not shown in FIG. 2.

Reader device 240 may include a device that reads credentials from a user and provides the credentials to controller 210. For example, reader device 240 may include a keypad configured to receive an alphanumeric personal identification number (PIN) from a user; a card reader to configure a card that stores a card code on a magnetic strip or another type of storage device, such as an RFID tag; a fingerprint reader configured to read a user's fingerprint; an iris reader configured to read a user's iris; a microphone and a voice signature identifier configured to record a user's voice signature; an near field communication NFC reader; and/or another type of reader device. Reader device 240 may include any type security device that can provide credentials, and may include one or more sensor devices, such any sensor device described below with reference to sensor 260. For example, reader device 240 may include a camera used for facial recognition and/or a microphone used for voice recognition.

Lock device 250 may include a lock controlled by controller 210. Lock device 250 may lock a door (e.g., prevent it from opening or closing), a window, an HVAC vent, and/or another type of access opening to a secure area. For example, lock device 250 may include an electromagnetic lock; a mechanical lock with a motor controlled by controller 210; an electromechanical lock; and/or another type of lock. Furthermore, lock device 250 may lock/unlock operation of a machine, transport vehicle, elevator, and/or an electrical device.

Sensor 260 may include a sensor device. As examples, sensor 260 may include a door sensor to sense whether a door is open or closed; a visible light monitoring camera, an infrared (IR) light monitoring camera, a heat signature monitoring camera, and/or another type of monitoring device; an alarm sensor, such as a motion sensor, a heat sensor, a pressure sensor, and/or another type of alarm sensor; an audio recording device (e.g., microphone); a tamper sensor, such as a position sensor located inside system unit 115; and/or a "request to exit" button located within a secured area associated with system unit 115; and/or another type of sensor device.

Actuator 270 may include an actuator device. As an example, actuator 270 may control an illumination device. As other examples, actuator 270 may include a burglar alarm activator; a speaker to play messages or generate alarm signals; a display device; a motor to move sensor 260 (e.g., control the field of view of a camera or other monitoring device); a motor for opening/closing a door, window, HVAC vent, and/or another opening associated with a secure area; a motor to secure lock device 250 in a locked or unlocked position; a fire extinguishing device; and/or another type of actuator device.

Although FIG. 2 shows exemplary components of system unit 115, in other implementations, system unit 115 may include fewer components, different components, additional components, or differently arranged components than depicted in FIG. 2. Additionally or alternatively, any component of system unit 115 (or any group of components) may perform the task or tasks described as performed by one or more other components of system unit 115. For example, in some implementations, peripheral interface 220 may correspond to a network interface. As another example, in some implementations, peripheral devices 230 may be connected to controller 210 via network interface 218, rather than via peripheral interface 220.

Further, although DCS 110 may include a physical access distributed control system, other implementations may control systems other than physical access systems. On the other hand, DCS 110 may include any type of physical access control systems (e.g., in an operational environment), such as a control system for opening and/or closing a door or controlling physical access to a building or facility. DCS 110 may also include a system to control a fan (e.g., start or stop), to initiate an alarm in a building management system (e.g., failed authentication, successful authentication, etc.), or to control a robot arm in an industrial automation system.

Figure 3A:
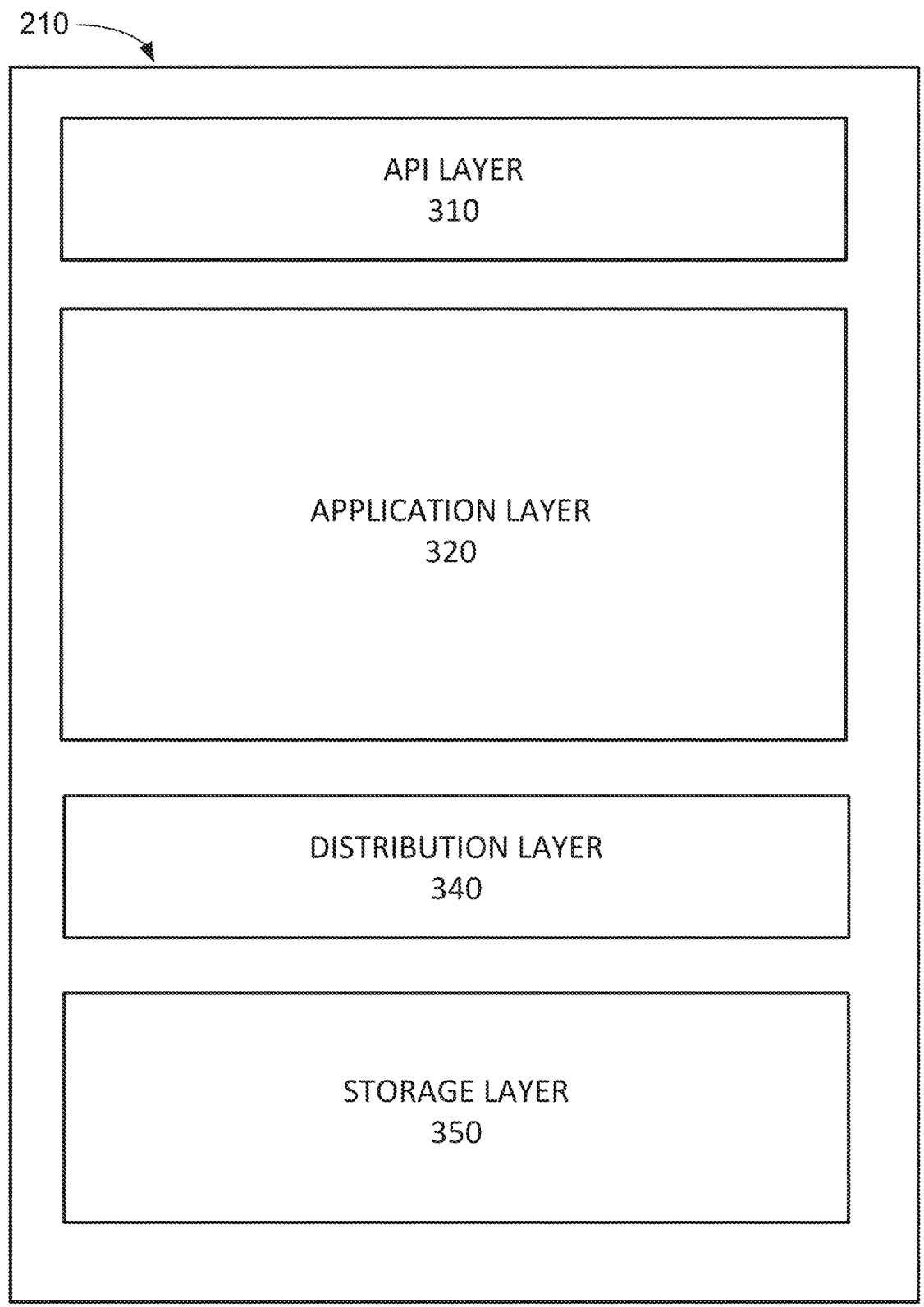
FIGS. 3A and 3B are block diagrams illustrating exemplary functional components of the system unit of FIG. 1.
Figure 3B:
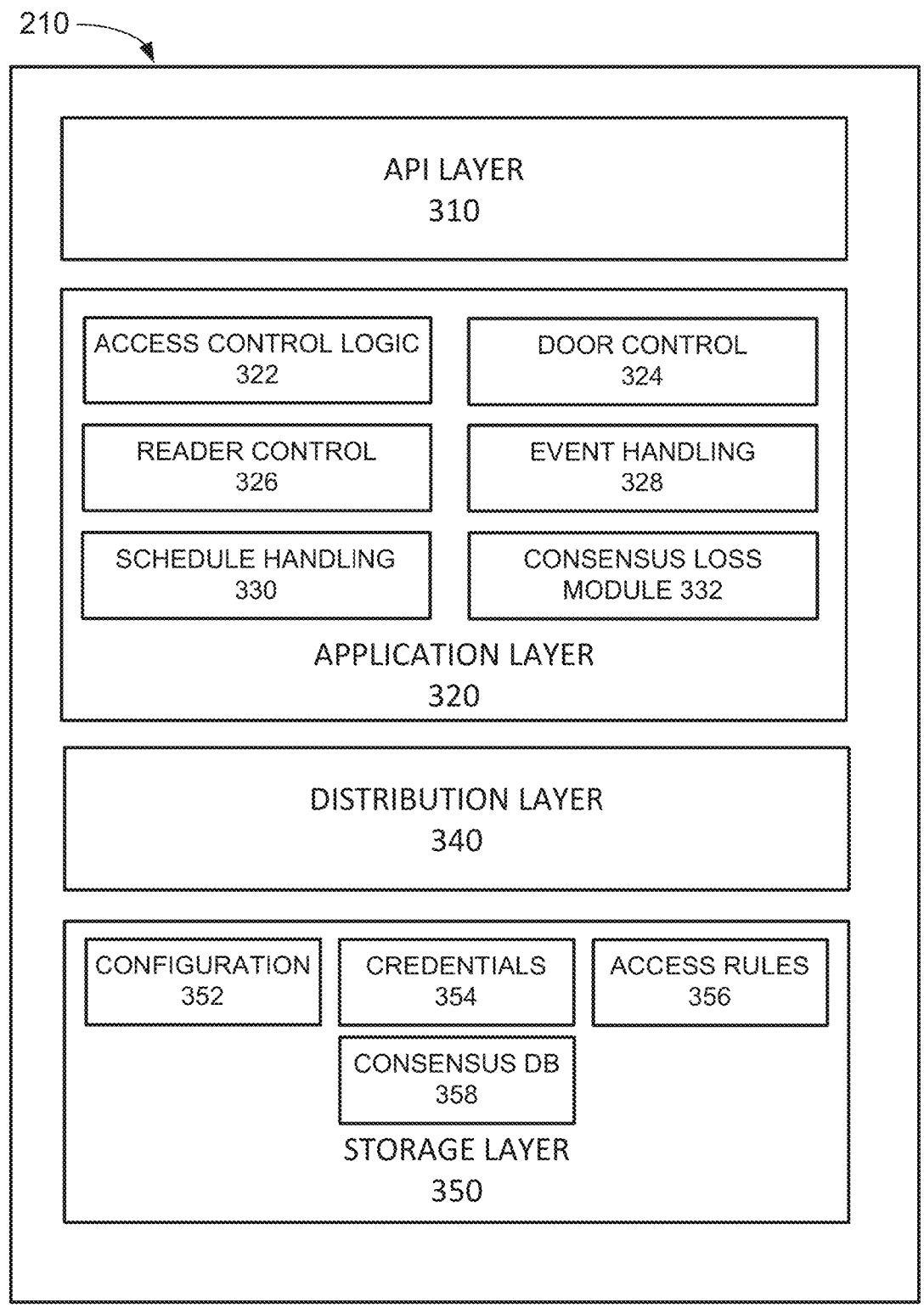

FIGS. 3A and 3B are block diagrams illustrating exemplary functional components of system unit 115. The functional components of system unit 115 may be implemented, for example, via hard-wired circuitry of one or more ASICs. Additionally or alternatively, the functional components of system unit 115 may be implemented by processor 214 executing instructions from memory 216. FIG. 3A illustrates the functional layers of system unit 115. As shown in FIG. 3A, system unit 115 may include an application programming interface (API) layer 310, an application layer 320, a distribution layer 340, and a storage layer 350.

API layer 310 includes an API configured to communicate, e.g., with administration device 130. As an example, when an administrator uses administrator device 130 to log into system unit 115, API layer 310 may communicate with administrator device 130 to authenticate the administrator. As another example, API layer 310 may communicate with administrator device 130 to change a configuration of system unit 115. API layer 310 may receive data from administrator device 130 and provide the data to distribution layer 340 and/or to storage layer 350. API layer 310 may also communicate with administrator device 130 to install an application in application layer 320. API layer 310 may be configured to handle different administrator types. For example, API layer 310 may include an API to handle a Web Services administrator, a Linux administrator, an Open Network Video Interface Forum (ONVIF) administrator, and/or another type of API.

Application layer 320 includes one or more applications installed on system unit 115. FIG. 3B shows exemplary applications. As shown in FIG. 3B, application layer 320 may include an access control logic application 322, a door control application 324, a reader control application 326, an event handling application 328, a schedule handling application 330, and/or a consensus loss module 332.

Access control logic application 322 may determine whether to grant access based on received credentials and based on stored access rules. Door control application 324 may control one or more doors and/or associated lock devices 250. For example, door control application 324 may determine whether a door is open or closed and/or locked or unlocked and may operate one or more device to open or close the door and/or to lock or unlock the door. Reader control application 326 may control one or more reader devices 240 and may obtain and process credentials received from the one or more reader devices 240. Event handling application 328 may maintain a log of events recorded or generated by system unit 115 and/or recorded by another system unit 115. Event handling application 328 may ensure that locally recorded or generated events are distributed to other system units 115 in DCS 110 in order to maintain a distributed system event log in all (or at least some) system units 115. Thus, logged events may be retrieved from any system unit 115 that is associated with the system event log. Schedule handling application 330 may manage one or more schedules associated with system unit 115. For example, access rules for particular groups of users may change based on particular times of day.

Consensus loss module 332 may detect consensus loss with respect to a distributed dataset. For example, consensus loss module 332 may determine which system units 115 are available and may determine whether the number of available system units 115, associated with a particular distributed dataset, is sufficient to reach a quorum with respect to proposed operation on the distributed dataset. If the number of available system units 115 drops below the number required to reach a quorum, consensus loss module 332 may detect a consensus loss with respect to the particular distributed dataset. Consensus loss module 332 may generate a list of available system units 115, associated with the particular distributed dataset, may generate a consensus loss alarm that includes the generated list, and may send the generated consensus loss alarm to a designated device. The designated device may correspond to administration device 130 and/or another device, such as a mobile communication device (e.g., mobile phone) of an administrator. If the administrator selects to generate a new set of system units 115 for the distributed dataset, the administrator may send an instruction to system unit 115 to generate the new set of system units 115. Consensus loss module 332 may generate the new set of system units 115 associated with the distributed dataset.

Other applications (not shown in FIG. 3B) may be included in application layer 320. As an example, an alarm application may generate a report and/or an alarm and send the report and/or alarm to administrator device 130 (and/or to another designated device) and/or one or more other system units 115. As another example, a task-specific control application may process events associated with system unit 115, such as door opening events, sensor events, actuator events, and/or other types of events.

Distribution layer 340 may manage one or more distributed datasets associated with system unit 115. For example, distribution layer 340 may maintain secure connections with other system units 115 over network 120. (e.g., a Transport Layer Security (TLS) connection). Furthermore, distribution layer 340 may use a protocol (e.g., a PAXOS protocol) to establish a consensus with respect to a change in a particular consensus-based distributed dataset. As an example, distribution layer 340 may send a proposal for a change to other system units 115 associated with the distributed dataset and may receive a quorum for the change from the other system units 115. As another example, distribution layer 340 may vote for a proposal received from another system unit 115. As yet another example, distribution layer 340 may receive an indication that a consensus has been reached for a change without having voted for the change. When an indication of consensus for a change is received, distribution layer 340 may make the change in the local copy of the distributed dataset.

Storage layer 350 stores one or more datasets associated with system unit 115. A dataset stored in storage layer 350 may correspond to a local dataset or may correspond to a distributed dataset. A local dataset may store information associated with (and/or only associated with) the particular system unit 115 that stores the local dataset. A distributed dataset may store information associated with other system units 115 associated with the distributed dataset.

Exemplary information that may be included in storage layer 350 is shown in FIG. 3B. As shown in FIG. 3B, storage layer 350 may include configuration data 352, credentials data 354, access rules data 356, and consensus database 358. Configuration data 352 may store configuration data associated with a particular system unit 115, such as hardware configuration of controller 210, peripheral devices 230 connected to controller 210, application installed in application layer 320, and/or other types of configuration information. Credentials data 354 may store credentials associated with system unit 115. Access rules 356 may store access rules associated with system unit 115. Consensus database 358 may store information that may be used by consensus loss module 332 to detect consensus loss. Exemplary information that may be stored in consensus database 358 is described below with reference to FIG. 4.

Although FIGS. 3A and 3B show exemplary functional components of system unit 115, in other implementations, system unit 115 may include fewer functional components, different functional components, differently arranged functional components, or additional functional components than depicted in FIGS. 3A and 3B. Additionally, any one of the components (or any group of components) of system unit 115 may perform functions described as performed by one or more other functional components of system unit 115.

Figure 4:
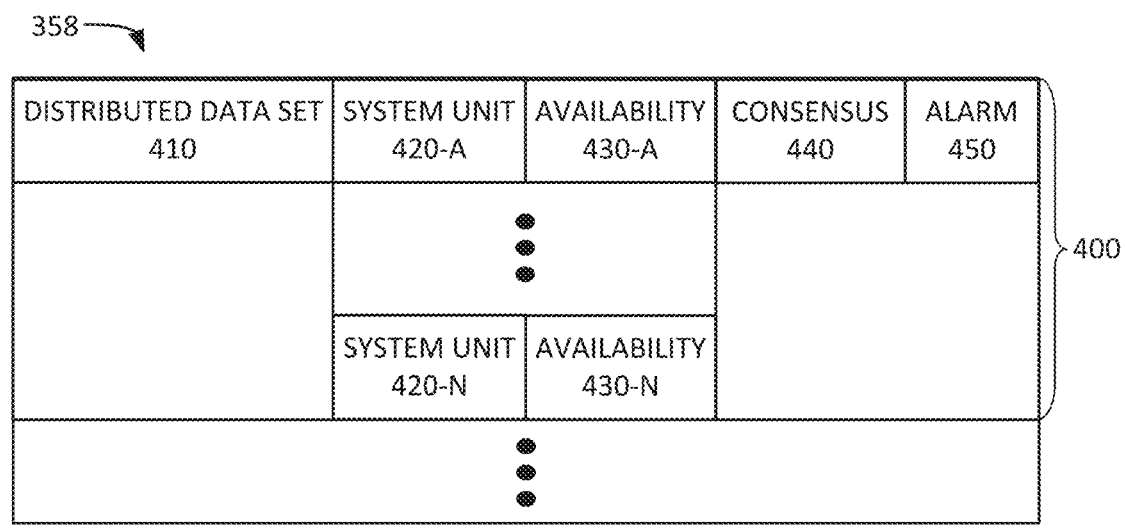
FIG. 4 is a diagram of exemplary information that may be stored in the consensus database of FIG. 3B.

FIG. 4 is a diagram of exemplary information that may be stored in the consensus database 358. As shown in FIG. 4, consensus database 358 may include one or more distributed dataset records 400. Each dataset record 400 may store information relating to a particular dataset with which system unit 115 is associated. Dataset record 400 may include a distributed dataset field 410, a set of system unit fields 420-A to 420-N, a corresponding set of availability fields 430-A to 430-N, a consensus field 440, and an alarm field 450.

Distributed dataset field 410 may store information identifying a particular distributed dataset associated with system unit 115. Each system unit field 420 may store information identifying another system unit 115 associated with the distributed dataset. A corresponding availability field 430 may store information about whether the other system unit 115 is available. Consensus field 440 may store information relating to consensus requirements associated with the particular distributed dataset. For example, consensus field 440 may store information about how many votes are needed from other system units 115 to reach a quorum for establishing consensus relating to proposed operation on the particular distributed dataset. Furthermore, consensus field 440 may store an indication that consensus loss has been detected if consensus loss module 332 detects consensus loss for the particular distributed dataset. In some implementations, different system units 115 may assigned different voting weights when voting for a proposed operation on the particular distributed dataset. The voting weight information may be stored in system unit fields 420 and/or in consensus field 440.

Alarm field 450 may store information relating to generation of a consensus loss alarm in response to a consensus loss being detected. For example, alarm field 450 may identify a particular communication method to be used in sending the consensus loss alarm and/or may identify a particular destination device to which the consensus loss alarm is to be sent.

Although FIG. 4 show exemplary components that may be stored in consensus database 358, in other implementations, consensus database 358 may include fewer components, different components, differently arranged components, or additional components than depicted in FIG. 4.

Figure 5:
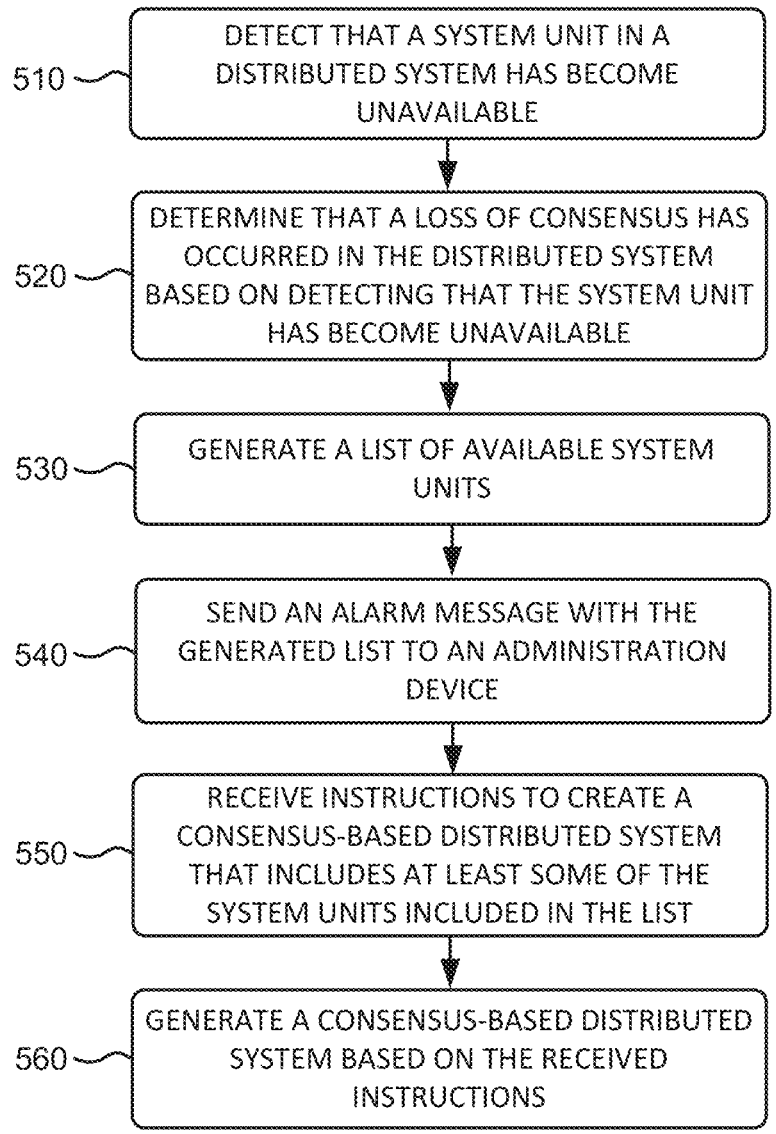
FIG. 5 is a flowchart for processing consensus loss in a distributed control system in one embodiment.

FIG. 5 is a flowchart for processing consensus loss in a distributed control system in one embodiment. In some implementations, the process of FIG. 5 may be performed by controller 210. In other implementations, some or all of the process of FIG. 5 may be performed by another device or a group of devices separate from controller 210 and/or including controller 210.

The process of FIG. 5 may include detecting that a system unit in a distributed system has become unavailable (block 510). System units 115 may exchange heartbeat messages at particular intervals. If a heartbeat message is not received from another system unit 115 within a particular time period, consensus loss module 332 may determine that the other system unit 115 has become unavailable. As an example, the other system unit 115 may have malfunction or lose power. As another example, a connection to the other system unit 115 may fail as a result of a broken link, network congestion, malfunctioning interface or networking device, and/or another cause. Consensus loss module 332 may store an indication of the unavailability of the other system unit 115 in consensus database 358.

As yet another example, a failing system unit 115 may send a message to other system units 115 indicating device failure, causing the other system units 115 to identify the failing system unit 115 as unavailable. As yet another example, a compromised system unit 115 may detect a security breach. For example, the compromised system unit 115 may include a tamper switch that becomes activated if controller 210 of the other system unit 115 is manipulated. In response to detecting the tampering, the compromised system unit 155 may send a message to the other system units 115 indicating a security breach and may deactivate itself. The other system units 115 may identify the compromised system unit 115 as unavailable in response to receiving the security breach message. Consensus loss module 332 may maintain a list of available system units 115, associated with distributed dataset, and may update the list of available devices at particular intervals.

A determination may be made that consensus loss has occurred in the distributed system based on detecting that the system unit has become unavailable (block 520). For example, consensus loss module 332 may determine how many system units 115, associated with a distributed dataset, are available and may determine whether the number of available system units 115 is less than the number of system units 115 required to reach a quorum to establish a consensus about a proposed operation on the distributed dataset. If the number of available system units 115 is less than the number of system units 115 required to reach the quorum, consensus loss module 332 may determine that a consensus loss has occurred for the distributed dataset.

A list of available system units may be generated (block 530) and an alarm message, which includes the generated list, may be sent to an administration device (block 540). For example, consensus loss module 332 may access consensus database 358 and may determine which system units 115, associated with the distributed dataset, are available. Consensus loss module 332 may access alarm field 450 to determine what communication method to use to send the consensus loss alarm and may determine a particular destination device to which the consensus loss alarm should be sent. The destination device may be administration device 130 and/or another device, such as an administrator's mobile communication device.

As an example, alarm field 450 may specify that a Web Services message should be sent to the destination device and consensus loss module 332 may send a Web Services message to the destination device. As another example, alarm field 450 may specify that an email message, a Short Message Service, or a real-time quality of service message should be sent to the destination device and consensus loss module 332 may send an email message, a Short Message Service, or a real-time quality of service message to the destination device.

Instructions may be received to create a consensus-based distributed system that includes at least some of the system units included in the list (block 550) and a consensus-based distributed system may be generated based on the received instructions (block 560). For example, system unit 115 may receive instructions from the destination device (e.g., administration device 130) to generate a consensus-based distributed system for the distributed dataset. The received instructions may include a list of system units 115 that are to be included in the new distributed system. As an example, the administrator may select to include all the available devices listed in the consensus loss alarm in the new distributed system. As another example, the administration may select to exclude some of the available devices from the new distributed system.

In some implementations, administration device 130 may send the instructions to a particular system unit 115 that is to be included in the new distributed system. In other implementations, administration device 130 may send the instructions to multiple (and possibly all) system units 115 that are to be included in the new distributed system. A system unit 115 that received the instructions may generate a new distributed dataset based on the distributed dataset associated with the consensus loss alarm and may then proceed to associate the other system units 115, which are to be included in the new distributed system, with the new distributed dataset.

System unit 115 may, when creating the new distributed system, select a number of system units 115 required to reach a quorum based on the smallest number of devices needed to achieve a majority. Thus, for example, if 6 system units 115 were selected by the administrator for the new distributed system, a quorum of 4 system units 115 may be set for the new distributed system.

In some implementations, different voting weights may be assigned to different system units 115 when voting for a quorum for a proposed operation for a distributed dataset. A particular system unit 115 may be given a higher or lower voting weight than other system units 115 based on the location of the particular system unit 115. For example, a particular location may be considered important and a system unit 115 at the particular location may thus be given a higher voting weight than other system units 115.

A particular system unit 115 may be given a higher or lower voting weight than other system units 115 based on a membership in a group of system units 115. For example, a distributed dataset may be associated with multiple groups of system units 115 based on one or more criteria and system units 115 in a first group may be given a higher voting weight than system units 115 in a second group. A particular system unit 115 may be given a higher or lower voting weight than other system units 115 based on a device type of the particular system unit 115. For example, a first system unit 115 may correspond to a new version with additional functionality and may be given a higher voting weight than other system units 115.

A particular system unit 115 may be given a higher or lower voting weight than other system units 115 based on a threat level assigned to the particular system unit 115. For example, a particular system unit 115 may be located in a high threat area, such as a public location, and may thus be given a lower voting weight than other system units 115. A particular system unit 115 may be given a higher or lower voting weight than other system units 115 based on a measure of reliability associated with the particular system unit 115. For example, a particular system unit 115 may have a high failure rate (e.g., due to environmental conditions) and may be given a lower voting weight than other system units 115. A particular system unit 115 may be given a higher or lower voting weight than other system units 115 based on one or more logged events associated with the particular system unit 115. For example, a particular system unit 115 may include a motion sensor that logs a large number of motion detection events and thus the particular system unit 115 may be given a higher voting weight than other system units 115.

A particular system unit 115 may be given a higher or lower voting weight than other system units 115 based on a frequency of activation of a peripheral device associated with the particular system unit 115. For example, a particular system unit 115 may experience high traffic, causing a lock device 250 to be activated with a higher frequency than lock devices 250 associated with other system units 115, and may be given a higher voting weight than other system units 115. A particular system unit 115 may be given a higher or lower voting weight than other system units 115 based on a frequency of administrative login associated with the particular system unit 115. For example, a particular system unit 115 may be used by administration device 130 more frequently than other system units 115 and may be given a higher voting weight than other system units 115.

In some implementations, system units 115 may need to continue to use a distributed dataset after a consensus loss is detected and before a response is received from administration device 130 instructing system units 115 to generate a new distributed dataset. Thus, in some implementations, in response to detecting a consensus loss, system unit 115 may generate an emergency distributed dataset based on the distributed dataset and based on the list of available system units 115. The emergency distributed dataset may be used by the system units 115 until an administrator responds to the generated consensus loss alarms. After instructions are received from administration device 130 to create a new distributed system, data from the emergency distributed dataset may be incorporated into the new distributed dataset.

In some implementations, after the new distributed dataset has been created, one or more system units 115, that were previously associated with the distributed dataset and that have become unavailable, may again become available. For example, a faulty system unit 115 may be repaired or a broken connection may be restored. A restored system unit 115 may request to rejoin the distributed dataset. While the restored system unit 115 has been unavailable, the restored system unit 115 may have accumulated data relevant to the distributed dataset. The restored system unit 115 may request to be added to the new distributed system that was created after consensus loss. A system unit 115 that is associated with the new distributed dataset may receive a request from the restored system unit 115 to be added to the new distributed dataset and may add the restored system unit 115 to the new distributed dataset. The system unit 115 may subsequently receive a request from the restored system unit 115 to add device data to the new distributed dataset, may determine whether the device data is consistent with the new distributed dataset; and may add the device data to the new distributed dataset, if the device data is consistent with the distributed dataset.

Figure 6:
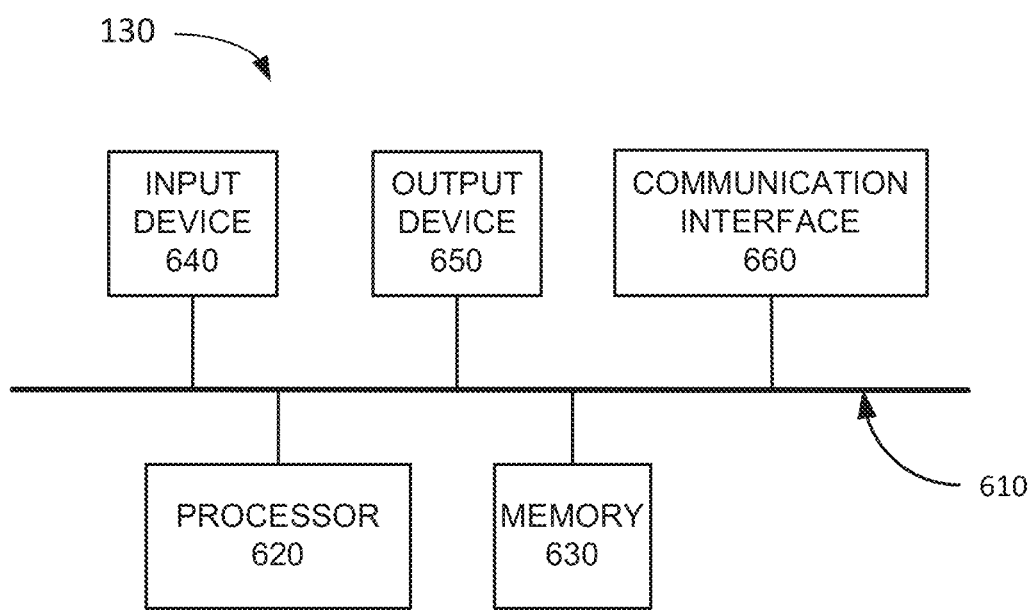
FIG. 6 is a diagram illustrating exemplary components of the administration device of FIG. 1.

FIG. 6 is a block diagram illustrating exemplary components of administration device 130. As shown in FIG. 6, administration device 130 may include a bus 610, a processor 620, a memory 630, an input device 640, an output device 650, and a communication interface 660.

Bus 610 may include a path that permits communication among the components of administration device 130. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an ASIC, an FPGA, and/or another type of integrated circuit or processing logic.

Memory 630 may include any type of dynamic storage device that may store information and/or instructions, for execution by processor 620, and/or any type of non-volatile storage device that may store information for use by processor 620. For example, memory 630 may include a RAM or another type of dynamic storage device, a ROM device or another type of static storage device, a CAM, a magnetic and/or optical recording memory device and its corresponding drive (e.g., a hard disk drive, optical drive, etc.), and/or a removable form of memory, such as a flash memory.

Input device 640 may allow an operator to input information into administration device 130. Input device 640 may include, for example, a keyboard, a mouse, a pen, a microphone, a remote control, an audio capture device, an image and/or video capture device, a touchscreen display, and/or another type of input device. In some implementations, administration device 130 may be managed remotely and may not include input device 640. In other words, administration device 130 may be "headless" and may not include a keyboard, for example.

Output device 650 may output information to an operator of administration device 130. Output device 650 may include a display, a printer, a speaker, and/or another type of output device. For example, administration device 130 may include a display, which may include a liquid-crystal display (LCD) for displaying content to an administrator. The display may correspond to a touchscreen. In some embodiments, administration device 130 may be managed remotely and may not include output device 650. In other words, administration device 130 may be "headless" and may not include a display, for example.

Communication interface 660 may include a transceiver that enables administration device 130 to communicate with other devices and/or systems via wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 660 may include a transmitter that converts baseband signals to RF signals and/or a receiver that converts RF signals to baseband signals. Communication interface 660 may be coupled to an antenna for transmitting and receiving RF signals.

Communication interface 660 may include a logical component that includes input and/or output ports, input and/or output systems, and/or other input and output components that facilitate the transmission of data to other devices. For example, communication interface 660 may include a network interface card (e.g., Ethernet card) for wired communications and/or a wireless network interface (e.g., a WiFi) card for wireless communications. Communication interface 660 may also include a USB port for communications over a cable, a Bluetooth™ wireless interface, an RFID interface, an NFC wireless interface, and/or any other type of interface that converts data from one form to another form.

As described below, administration device 130 may perform certain operations relating to management of consensus loss alarms received from system units 115. Administration device 130 may perform these operations in response to processor 620 executing software instructions contained in a computer-readable medium, such as memory 630. Memory 630 may be implemented within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of administration device 130, in other implementations, administration device 130 may include fewer components, different components, additional components, or differently arranged components than depicted in FIG. 6. Additionally or alternatively, one or more components of administration device 130 may perform one or more tasks described as performed by one or more other components of administration device 130.

Figure 7:
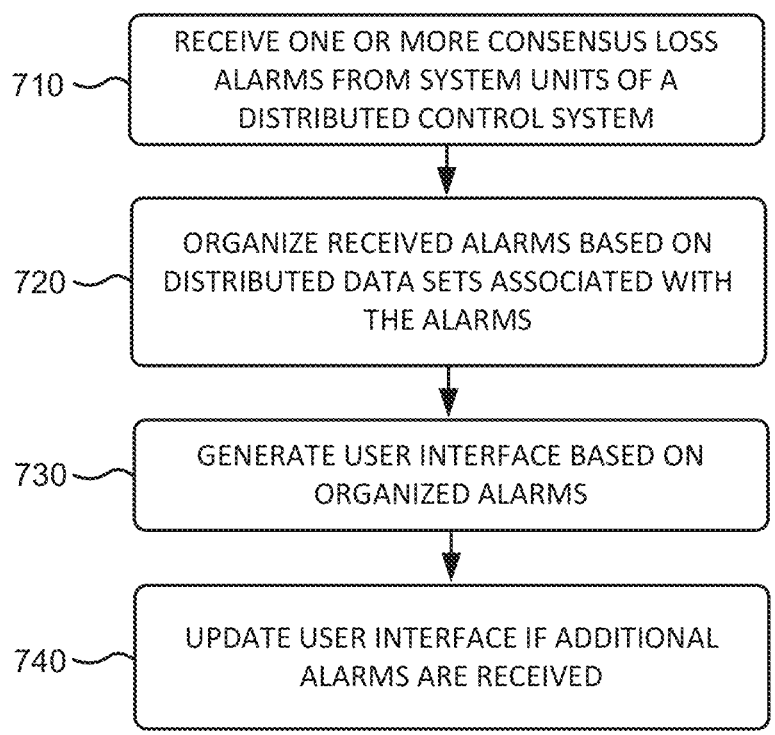
FIG. 7 is a flowchart for processing consensus loss alarms received from system units of a distributed control system in one embodiment.

FIG. 7 is a flowchart for processing consensus loss alarms received from system units of a distributed control system in one embodiment. In some implementations, the process of FIG. 7 may be performed by administration device 130. In other implementations, some or all of the process of FIG. 7 may be performed by another device or a group of devices separate from administration device 130 and/or including administration device 130.

The process of FIG. 7 may include receiving one or more consensus loss alarms from system units of a distributed control system (block 710). Administration device 130 may include a consensus loss alarm application. The consensus loss alarm application may be configured to receive consensus alarms from system units 115 of DCS 110. When consensus loss is detected by system unit 115, the consensus alarm may receive one or more consensus loss alarms. In some implementations, the consensus loss alarms may be presented as a sequence of alerts that are provided as they are received. Additionally or alternatively, the consensus loss alarms may be organized and consolidated before being presented to the administrator.

The received alarms may be organized based on distributed datasets associated with the alarms (block 720) and a user interface may be generated based on the organized alarms (block 730). For example, if a consensus loss is detected for a distributed dataset, the functioning system units 115 (e.g., all functional system units 115) that are associated with the distributed dataset may send a consensus loss alarm to administration device 130. Some of the received consensus loss alarms for a particular distributed dataset may include identical lists of available devices. The consensus loss alarm application may organize the received lists of available devices so that duplicate lists need to be presented. An alert may be generated on administration device 130 and, when an administrator selects to view the generated alert, the generated user interface may be presented to the administrator.

The user interface may be updated if additional alarms are received (block 740). As additional consensus loss alarms are received, the consensus loss alarm application may update the generated user interface to include information received from the additional consensus loss alarms received by administration device 130 from system units 115.

Figure 8:
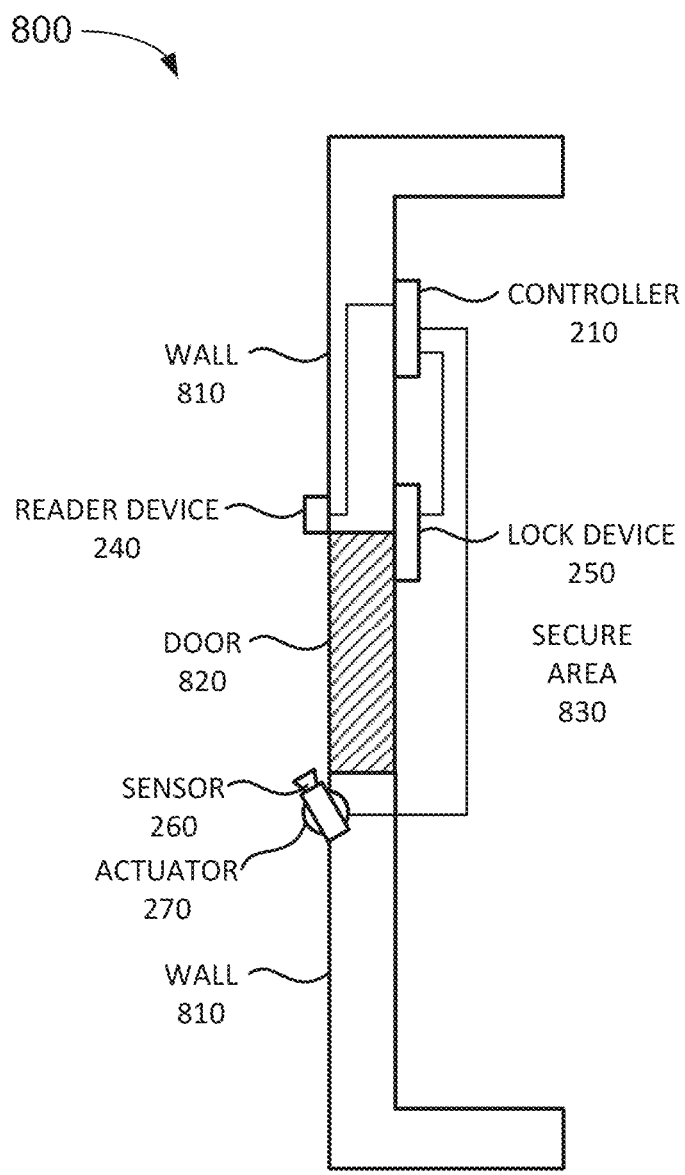
FIG. 8 is a floor plan diagram illustrating an exemplary physical layout of the system unit of FIG. 1.

FIG. 8 is a floor plan diagram illustrating an exemplary physical layout 800 of system unit 115. As shown in FIG. 8, physical layout 800 may include a wall 810, a door 820, controller 210, reader device 240, lock device 250, sensor 260, and actuator 270.

Wall 810 encloses a secure area 830, such as a room in a building. Door 820 provides access for a user to secure area 830. In this embodiment, controller 210 is installed inside secure area 830. In other embodiments, controller 210 may be installed in an insecure area 850. Reader device 240 is installed outside secure area 830 and lock device 250 is installed inside secure area 830 to wall 810 and door 820. Sensor 260, in this example, is a monitoring device mounted outside secure area 830 in an insecure area outside door 820. Actuator 270 includes a motor used to control the field of view of the monitoring device in this example.

When a user enters credentials into reader device 240 (e.g., by entering a PIN, scanning an access card, scanning an iris, etc.), controller 210 may use the credentials to authenticate the identity of the user and may perform a lookup in an access rules table to determine whether to grant access to the user based on the identity of the user and the access rules. If controller 210 determines that access should be granted, controller 210 activates lock device 250 to unlock door 820, thus granting access to the user to secure area 830.

Although FIG. 8 shows exemplary components of physical layout 800, in other implementations, physical layout 800 may include fewer components, different components, additional components, or differently arranged components than depicted in FIG. 8. Additionally or alternatively, any one component (or group of components) in physical layout 800 may perform a task or tasks described as performed by one or more other components of physical layout 800.

Figure 9:
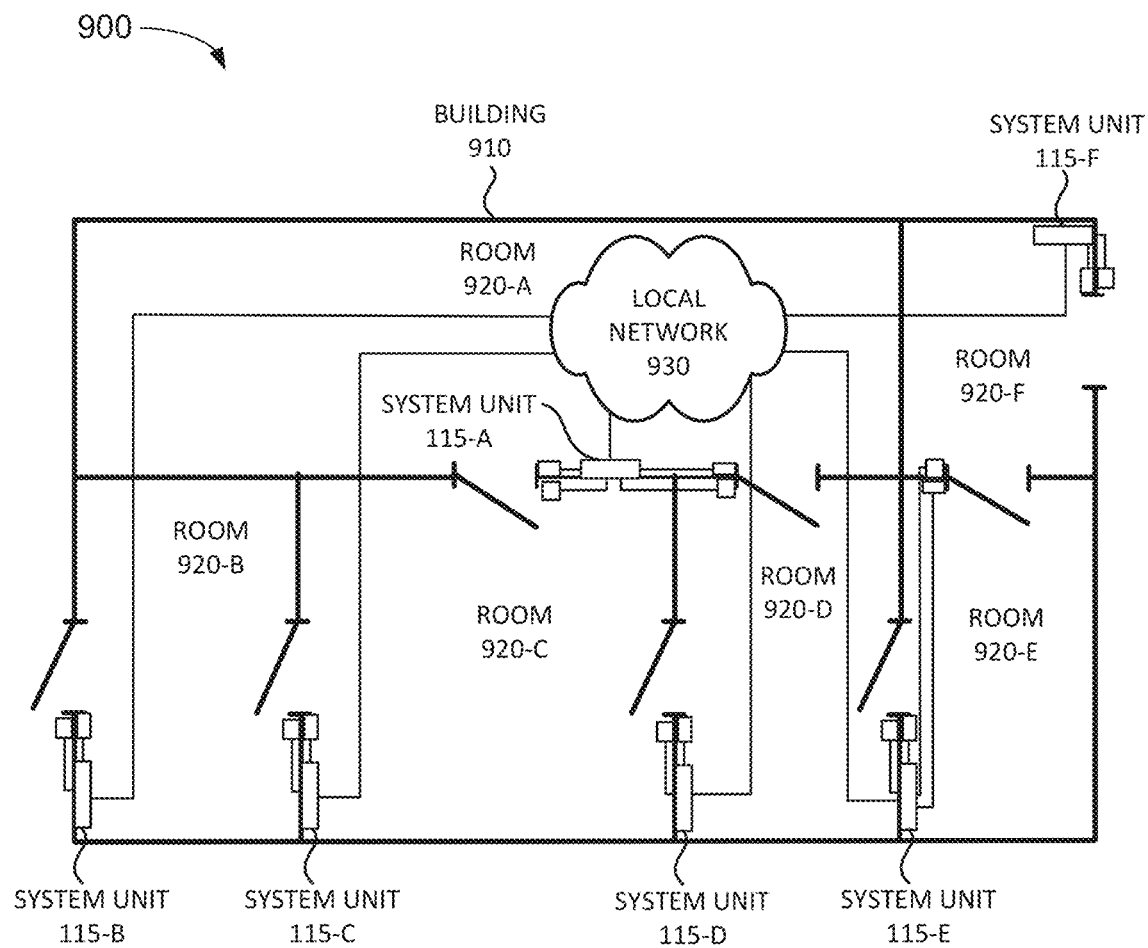
FIG. 9 is a floor plan diagram illustrating an exemplary physical layout of the system of FIG. 1.

FIG. 9 is a floor plan diagram illustrating an exemplary physical layout 900 of DCS 110. As shown in FIG. 9, physical layout 900 may include a building 910 with rooms 920-A through 920-F. A local network 930, such as an Ethernet network, may interconnect system units 115-A through 115-F. In this example, system unit 115-A controls two doors into room 920-A; system unit 115-B controls an outside door into room 920-B; system unit 115-C controls one door from room 920-B to room 920-C, system unit 115-D controls one door from room 920-C to room 920-D; system unit 115-E controls one door from room 920-D to room 920-E; and system unit 115-F controls an outside door into room 920-F.

In this example, system units 115-A to 115-F do not include a central controlling device (e.g., a server) and may include one or more distributed datasets. For example, system units 115-A through 115-F may maintain a distributed credentials table, a distributed access rules table, and/or a distributed events log. Assume an administrator uses administration device 130 to log into system unit 115-A to add a user and to add credentials associated with a user. Those added credentials may be distributed to the other system units 115 that control doors to rooms to which the user has access. If system unit 115-B fails, for example, data collected by system unit 115-B may continue to be available as a result of a distributed events log included in the other system units.

Although FIG. 9 shows exemplary components of physical layout 900, in other implementations, physical layout 900 may include fewer components, different components, additional components, or differently arranged components than depicted in FIG. 9. For example, in another embodiment, a central controlling device (e.g., a server) may be used in conjunction with one or more distributed datasets. Additionally or alternatively, one or more components of physical layout 900 may perform one or more tasks described as performed by one or more other components of physical layout 900.

Figures 10A, 10B:
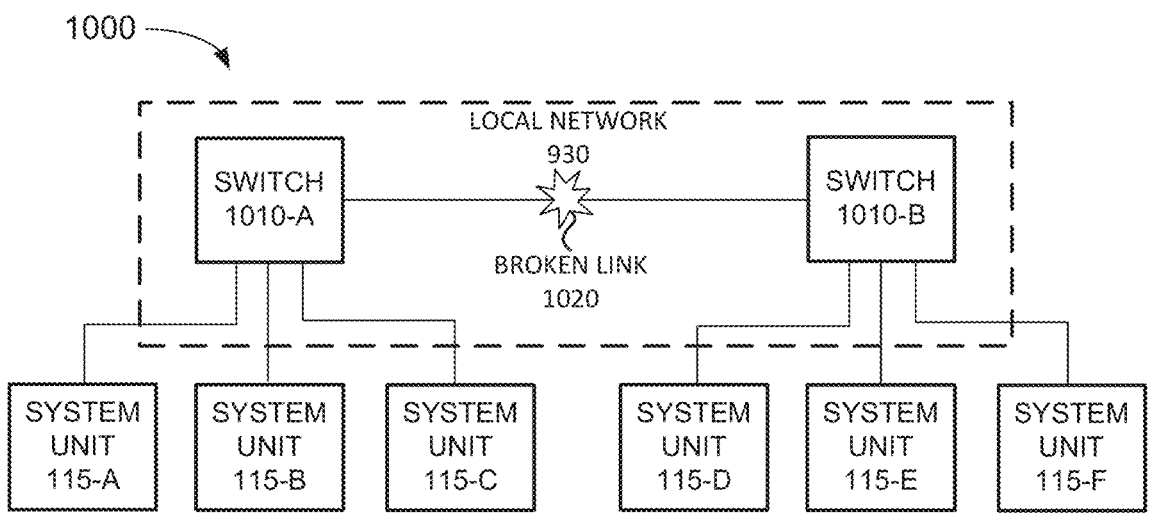
FIGS. 10A-10C are diagrams of an exemplary consensus loss scenario according to one or more implementations described herein.
Figure 10C:
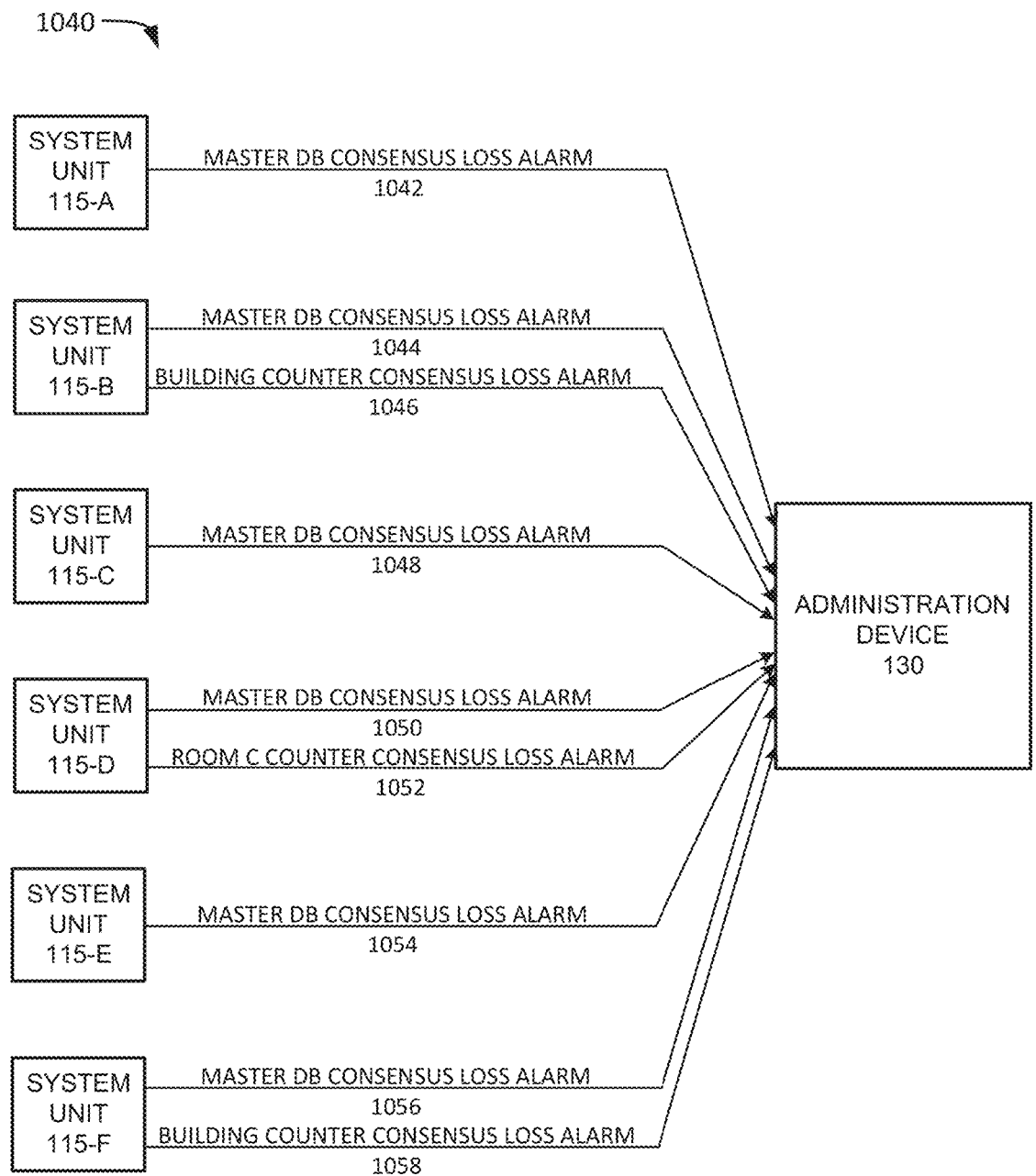

FIGS. 10A-10C are diagrams of an exemplary consensus loss scenario according to one or more implementations described herein. FIG. 10A illustrates a possible network topology 1000 of system units 115 in physical layout 900 of FIG. 9. As shown in FIG. 10A, local network 930 may include an Ethernet switch 1010-A and an Ethernet switch 1010-B. Ethernet switch 1010-A may be connected to controllers of system units 115-A, 115-B, and 115-C. Ethernet switch 1010-B may be connected to controllers of system units 115-D, 115-E, and 115-F. Ethernet switches 1010-A and 1010-B may be connected with an Ethernet cable. Assume that the Ethernet cable is damaged, resulting in broken link 1020. Broken link 1020 may cause system units 115-A, 115-B, and 115-C to be unable to communicate with system units 115-D, 115-E, and 115-F.

FIG. 10B illustrates a table 1030 that may correspond to part of the information stored in consensus database 358. As shown in FIG. 10B, table 1030 includes information relating to distributed datasets associated with system units 115-A to 115-F. Table 1030 may include information relating to a master database distributed dataset, a building counter distributed dataset, and a room C counter distributed dataset. A master database distributed dataset may be associated with system units 115-A to 115-F. The master database may store, for example, encrypted credentials information, access rules information, system units 115 configuration information, and/or other type of information. In one embodiment, in this example, all of system units 115-A to 115-F may be associated with the master database distributed dataset. Furthermore, a quorum of 4 system units may be required to reach a consensus relating to changes to the master database distributed dataset. In other embodiments in other examples, not all of system units 115-A to 115-F are necessarily associated with the master database distributed dataset.

The building counter distributed dataset may store information relating to a building counter application. The building counter application may keep track of people entering and leaving building 910 and may maintain information about how many people are currently inside building 910. Since only system units 115-B and 115-F control exits for building 910, only system units 115-B and 115-F are associated with the building counter distributed dataset. Furthermore, a quorum of 2 system units may be required to reach a consensus relating to changes to the building counter distributed dataset.

The room C counter distributed dataset may store information relating to a counter application for room 920-C. For example, room 920-C may correspond to a cafeteria and a room C counter application may keep track of how many people are currently in the cafeteria. Since only system units 115-A, 115-C, and 115-D control doors to room 920-C, only system units 115-A, 115-C, and 115-D are associated with the room C counter distributed dataset. Furthermore, a quorum of 2 system units may be required to reach a consensus relating to changes to the building counter distributed dataset.

Broken link 1020 may result in the generation of consensus loss alarms. FIG. 10C illustrates a signal flow 1040 that includes consensus loss alarms generated by particular ones of system units 115-A to 115-F in response to broken link 1020. System unit 115-A can no longer reach system units 115-D, 115-E, and 115-F. Therefore, system unit 115-A cannot reach the required quorum of 4 with respect to the master database distributed dataset. Therefore, system unit 115-A may generate and send a master database consensus loss alarm 1042 to administration device 130. Master database consensus loss alarm 1042 may list system units 115-A, 115-B, and 115-C as the available devices. Furthermore, since system unit 115-A can still reach system unit 115-C, system unit 115-A can reach the required quorum of 2 with respect to the room C counter distributed dataset and thus no loss of consensus will be detected for the room C counter distributed dataset.

System unit 115-B can no longer reach system units 115-D, 115-E, and 115-F. Therefore, system unit 115-B cannot reach the required quorum of 4 with respect to the master database distributed dataset. Therefore, system unit 115-B may generate and send a master database consensus loss alarm 1044 to administration device 130. Master database consensus loss alarm 1044 may list system units 115-A, 115-B, and 115-C as the available devices. Furthermore, system unit 115-B cannot reach the required quorum of 2 with respect to the building counter distributed dataset. Therefore, system unit 115-B may generate and send a building counter consensus loss alarm 1046 to administration device 130. Building counter consensus loss alarm 1046 may list system unit 115-B as the only available device.

System unit 115-C can no longer reach system units 115-D, 115-E, and 115-F. Therefore, system unit 115-C cannot reach the required quorum of 4 with respect to the master database distributed dataset. Therefore, system unit 115-C may generate and send a master database consensus loss alarm 1048 to administration device 130. Master database consensus loss alarm 1048 may list system units 115-A, 115-B, and 115-C as the available devices. Furthermore, since system unit 115-C can still reach system unit 115-A, system unit 115-C can reach the required quorum of 2 with respect to the room C counter distributed dataset and thus no loss of consensus will be detected for the room C counter distributed dataset.

System unit 115-D can no longer reach system units 115-A, 115-B, and 115-C. Therefore, system unit 115-D cannot reach the required quorum of 4 with respect to the master database distributed dataset. Therefore, system unit 115-D may generate and send a master database consensus loss alarm 1050 to administration device 130. Master database consensus loss alarm 1050 may list system units 115-D, 115-E, and 115-F as the available devices. Furthermore, system unit 115-D cannot reach the required quorum of 2 with respect to the room C counter distributed dataset. Therefore, system unit 115-D may generate and send a room C counter consensus loss alarm 1052 to administration device 130. Room C counter consensus loss alarm 1052 may list system unit 115-D as the only available device.

System unit 115-E can no longer reach system units 115-A, 115-B, and 115-C. Therefore, system unit 115-E cannot reach the required quorum of 4 with respect to the master database distributed dataset. Therefore, system unit 115-E may generate and send a master database consensus loss alarm 1054 to administration device 130. Master database consensus loss alarm 1054 may list system units 115-D, 115-E, and 115-F as the available devices.

System unit 115-F can no longer reach system units 115-A, 115-B, and 115-C. Therefore, system unit 115-F cannot reach the required quorum of 4 with respect to the master database distributed dataset. Therefore, system unit 115-F may generate and send a master database consensus loss alarm 1056 to administration device 130. Master database consensus loss alarm 1056 may list system units 115-D, 115-E, and 115-F as the available devices. Furthermore, system unit 115-F cannot reach the required quorum of 2 with respect to the building counter distributed dataset. Therefore, system unit 115-F may generate and send a building counter consensus loss alarm 1058 to administration device 130. Building counter consensus loss alarm 1058 may list system unit 115-F as the only available device.

Figure 11:
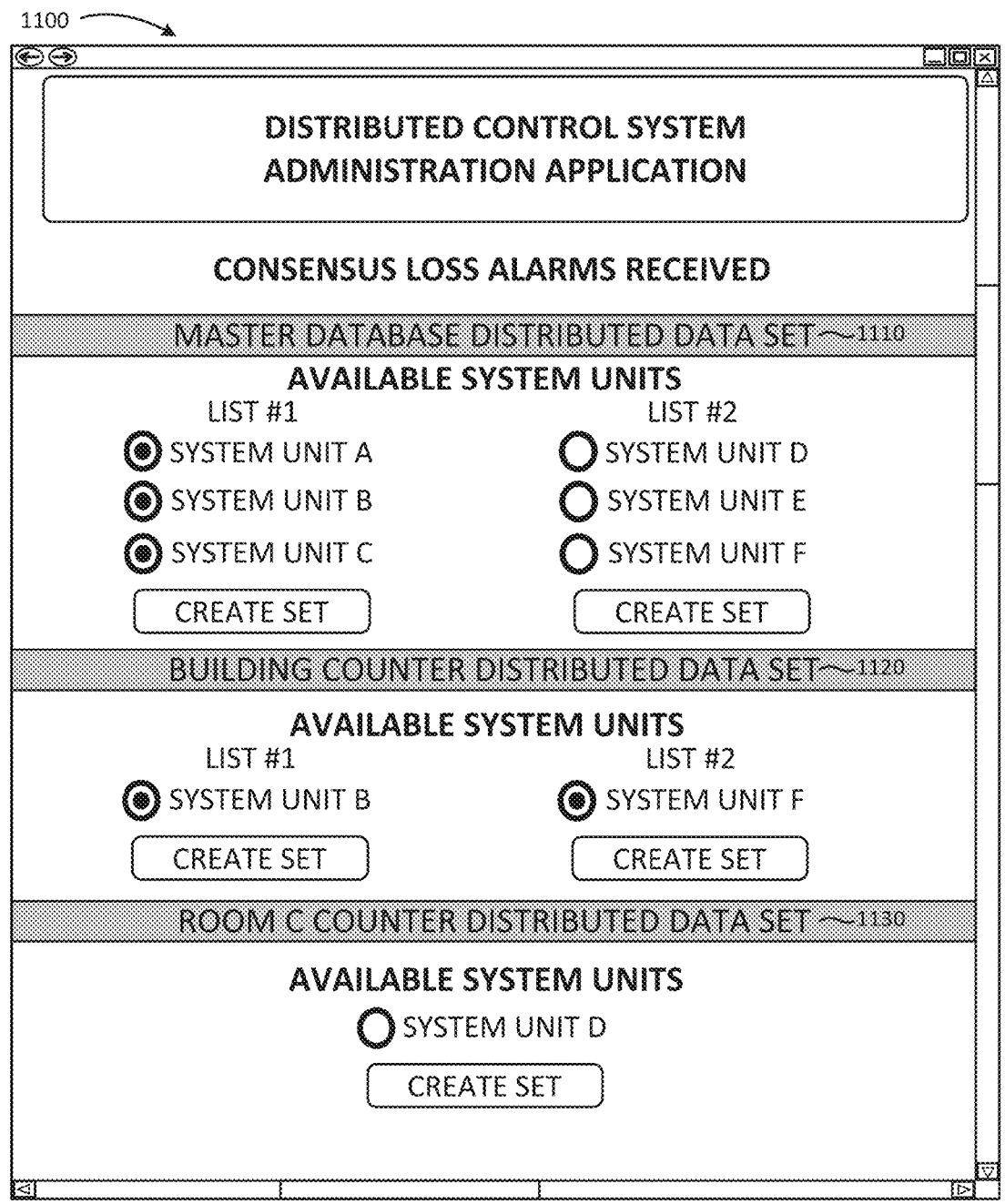
FIG. 11 is a diagram of an exemplary user interface according to one or more implementations described herein.

FIG. 11 is a diagram of an exemplary user interface 1100 according to one or more implementations described herein. As shown in FIG. 11, user interface 1100 may be generated by administration device 130 in response to receiving the consensus loss alarms shown in FIG. 10C. User interface 1100 may include a master database distributed dataset list 1110, a building counter distributed dataset list 1120, and a room C counter distributed dataset list 1130.

Master database distributed dataset list 1110 may include two lists. The first list may be generated based on information received from master database consensus loss alarms 1042, 1044, and 1048, and the second list may be generated based on information received from master database consensus loss alarms 1050, 1054, and 1056. In this case, the administrator may select one of the two lists as the new consensus-based system for the master database distributed dataset and de-select the other list in order to avoid a split-brain problem of having two different versions of the master database distributed dataset. For example, if the administrator selects system units 115-A, 115-B, and 115-C, then system units 115-D, 115-E, and 115-F will not be able to make changes to the master database.

Building counter distributed dataset list 1120 may include also two lists. The first list may be generated based on information received from building counter consensus loss alarm 1046 and the second list may be generated based on information received from building counter consensus loss alarm 1058. In this case, the administrator may select both of the lists, which may result in a split-brain problem. However, the administrator may consider it important to continue to keep track of people entering and leaving the building and may choose to manually reconcile the building counter datasets from system units 115-B and 115-F.

Room C counter distributed dataset list 1130 may include a list generated based on information received from room C counter consensus loss alarm 1052. The administrator may choose to ignore this alarm as the administrator may recognize, based on the configuration of the system, that system units 115-A and 115-C are still able to obtain a quorum with respect to the room C counter distributed dataset.

This application incorporates by reference the following applications filed the same day as the present patent application Ser. No. 14/028,218, titled "Event Timeline Generation" application Ser. No. 14/028,118, titled "Control System Configuration Within an Operational Environment" application Ser. No. 14/028,236, titled "Anonymous Decisions in an Access Control System" application Ser. No. 14/028,059, titled "Joining a Distributed Database" application Ser. No. 14/028,198, titled "Distributed Events in an Access Control System" application Ser. No. 14/028,230, titled "Managing Application Data in Distributed Control Systems"; and application Ser. No. 14/028,208, titled "Distribution of User Credentials".

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a device in a distributed system, the method comprising:
   detecting, by the device, that another device in the distributed system has become unavailable;
   determining, by the device, that a loss of consensus has occurred in the distributed system for a particular distributed dataset based on detecting that the other device has become unavailable;
   accessing, by the device, a consensus database to determine which devices associated with the particular distributed dataset are available;
   generating, by the device, a list of available devices in the distributed system based on accessing the consensus database and based on determining that the loss of consensus has occurred; and sending, by the device, an alarm message to an administrative device, wherein the alarm message indicates the loss of consensus and wherein the alarm message includes the list of available devices.

2. The method of claim 1, further comprising:

receiving, from the administrative device, an instruction to create a consensus-based distributed system that includes at least some of the available devices included in the list; and creating the consensus-based distributed system in response to receiving the instruction.

3. The method of claim 2, wherein creating the consensus-based distributed system includes:

selecting a number of devices required to generate a quorum, wherein the number corresponds to a smallest number of devices from the available devices needed to achieve a majority.

4. The method of claim 3, further comprising:

assigning a voting weight to a device of the at least some of the available devices, wherein the voting weight gives more weight to a vote received from the device than to a vote received from another device of the at least some of the available devices when the device is voting for a quorum in the created the consensus-based distributed system.

5. The method of claim 4, wherein the voting weight is based on at least one of:

a location of the device;

a membership of the device in a particular subset of the available devices;

a device type associated with the device;

a threat level assigned to the device; or a measure of reliability associated with the device.

6. The method of claim 4, wherein the voting weight is based on at least one of:

one or more logged events associated with the device;

a frequency of activation of a peripheral device associated with the device; or a frequency of administrative login associated with the device.

7. The method of claim 1, wherein detecting that another device in the distributed system has become unavailable includes at least one of:

detecting that a connection to the other device has been lost;

receiving an indication of device failure from the other device; or detecting that the other device is associated with a security breach.

8. The method of claim 1, wherein sending the alarm message to the administrative device includes at least one of:

sending a Web Services message to the administrative device;

sending an email message to the administrative device;

sending a Short Message Service message to the administrative device; or sending a real-time quality of service message to the administrative device.

9. The method of claim 1, further comprising:

maintaining the list of available devices in the distributed system; and updating the list of available devices at particular intervals.

10. The method of claim 1, wherein the distributed system includes a distributed dataset, the method further comprising:

generating another distributed dataset based on the distributed dataset, in response to determining that a loss of consensus has occurred in the distributed system and before receiving, from the administrator device, an instruction to create a new consensus-based distributed system that includes at least some of the available devices included in the list; and creating another consensus-based distributed system that uses the generated other distributed dataset and that includes at least some of the available devices included in the list.

11. The method of claim 10, further comprising:

receiving, from the administrative device, the instruction to create the new consensus-based distributed system that includes the available devices included in the list; and incorporating data from the other distributed dataset into the new distributed dataset, in response to receiving the instruction to create the new consensus-based distributed system.

12. The method of claim 1, wherein the device corresponds to an embedded system.

13. The method of claim 12, wherein the distributed system includes a distributed physical access control system, and wherein the device and the other device correspond to physical access control units.

14. A device of a distributed system comprising:

logic configured to:

detect that another device in the distributed system has become unavailable;

determine that a loss of consensus has occurred in the distributed system for a particular distributed dataset based on detecting that the other device has become unavailable;

access a consensus database to determine which devices associated with the particular distributed dataset are available;

generate a list of available devices in the distributed system based on accessing the consensus database and based on determining that the loss of consensus has occurred;

a transmitter to send an alarm message to an administrative device, wherein the alarm message indicates the loss of consensus and wherein the alarm message includes the list of available devices; and a memory to store the consensus database.

15. The device of claim 14, further comprising:

a receiver to receive, from the administrative device, an instruction to create a consensus-based distributed system that includes at least some of the available devices included in the list; and wherein the logic is further configured to create the consensus-based distributed system in response to receiving the instruction.

16. The device of claim 15, wherein when the logic is creating the consensus-based distributed system, the logic is further configured to:

select a number of devices required to generate a quorum, wherein the number corresponds to a smallest number of devices from the available devices needed to achieve a majority.

17. The device of claim 16, wherein when the logic is creating the consensus-based distributed system, the logic is further configured to:

assign a voting weight to a device of the at least some of the available devices, wherein the voting weight gives more weight to a vote received from the device than to a vote received from another device of the at least some of the available devices when the device is voting for a quorum in the created the consensus-based distributed system.

18. The device of claim 17, wherein the voting weight is based on at least one of:
   a location of the device;
   a membership of the device in a particular subset of the available devices;
   a device type associated with the device;
   a threat level assigned to the device;
   a measure of reliability associated with the device;
   one or more logged events associated with the device;
   a frequency of activation of a peripheral device associated with the device; or
   a frequency of administrative login associated with the device.

19. The device of claim 14, wherein when the logic is detecting that another device in the distributed system has become unavailable, the logic is configured to:
   detect that a connection to the other device has been lost;
   receive an indication of device failure from the other device; or
   detect that the other device is associated with a security breach.

20. The device of claim 14, wherein when sending the alarm message to the administrative device, the transmitter is further configured to:
   send a Web Services message to the administrative device;
   send an email message to the administrative device;
   send a Short Message Service message to the administrative device; or
   send a real-time quality of service message to the administrative device.

21. The device of claim 14, wherein the distributed system includes a distributed dataset, and wherein the logic is further configured to:
   generate another distributed dataset based on the distributed dataset, in response to determining that a loss of consensus has occurred in the distributed system and before receiving, from the administrator device, an instruction to create a new consensus-based distributed system that includes at least some of the available devices included in the list;
   receive, from the administrative device, the instruction to create the new consensus-based distributed system that includes at least some of the available devices included in the list; and
   incorporate data from the other distributed dataset into the new distributed dataset, in response to receiving the instruction to create the new consensus-based distributed system.

22. The device of claim 14, wherein the distributed system includes a distributed physical access control system, and wherein the device and the other device correspond to physical access control units.

23. A distributed system comprising:
   a plurality of physical access control devices, wherein a particular one of the plurality of physical access control devices comprises:
      a processor configured to:
         detect that another device in the distributed system has become unavailable;
         determine that a loss of consensus has occurred in the distributed system for a particular distributed dataset based on detecting that the other device has become unavailable;
         access a consensus database to determine which devices associated with the particular distributed dataset are available; and
         generate a list of available devices in the distributed system based on accessing the consensus database and based on determining that the loss of consensus has occurred;
      a transmitter to send an alarm message to an administrative device, wherein the alarm message indicates the loss of consensus and wherein the alarm message includes the list of available devices; and
      a receiver to receive, from the administrative device, an instruction to create a consensus-based distributed system that includes at least some of the available devices included in the list,
   wherein the processor is further configured to create the consensus-based distributed system in response to receiving the instruction.

* * * * *